United States Patent
Kolluri Venkata Sesha et al.

(10) Patent No.: US 10,650,424 B2
(45) Date of Patent: May 12, 2020

(54) DYNAMIC CLOUD SOLUTION CATALOG

(71) Applicant: International Business Machines Corporation, Armonk, NY (US)

(72) Inventors: Saiprasad Kolluri Venkata Sesha, Bengaluru (IN); Takayuki Kushida, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1022 days.

(21) Appl. No.: 14/660,610

(22) Filed: Mar. 17, 2015

(65) Prior Publication Data
US 2016/0275577 A1    Sep. 22, 2016

(51) Int. Cl.
*G06Q 30/00*    (2012.01)
*G06Q 30/06*    (2012.01)
(Continued)

(52) U.S. Cl.
CPC ....... *G06Q 30/0603* (2013.01); *G06F 16/954* (2019.01); *G06Q 30/0631* (2013.01);
(Continued)

(58) Field of Classification Search
CPC ............ G06Q 30/0631; G06Q 30/0603; H04L 41/5054; H04L 41/0883; H04L 43/08; G06F 16/954
See application file for complete search history.

(56) References Cited

U.S. PATENT DOCUMENTS 8,402,139 B2    3/2013 Ferris et al.
8,924,559 B2 *  12/2014 Brown .................. G06Q 10/10
                                                     709/223
(Continued)

FOREIGN PATENT DOCUMENTS

CN    102640475 A    8/2012
CN    103607469 A    2/2014

OTHER PUBLICATIONS

"Moore, Keith, Resource Cataloging and Distribution System, Jan. 1997, University of Tennessee, pp. 1-16" (Year: 1997).*
(Continued)

*Primary Examiner* — William J Allen
*Assistant Examiner* — Maria S. P. Heath
(74) *Attorney, Agent, or Firm* — Peter J. Edwards (57) ABSTRACT

A cloud infrastructure is disclosed that includes: a cloud portal for providing user access to cloud resources; a cloud catalog database having a catalog list of cloud resources; a cloud catalog solution generator that populates the cloud catalog database, wherein the cloud catalog solution generator includes: a first interface process for receiving event data for resources associated within a cloud infrastructure; a second interface process for receiving usage/account information, monitored information, and document information; an aggregation system that continuously aggregates the event data with the usage/account information, monitored information, and document information to create a dynamic catalog list having supplementary information for items in the catalog list; and a third interface process for outputting the dynamic catalog list to a cloud catalog database; and a cloud catalog suggestion engine that processes user inputs entered via the cloud portal and outputs a set of suggested items from the cloud catalog database.

7 Claims, 6 Drawing Sheets

(51) Int. Cl.
  *H04L 12/24*  (2006.01)
  *G06F 16/954*  (2019.01)
  *H04L 12/26*  (2006.01)

(52) U.S. Cl.
  CPC ..... *G06Q 30/0643* (2013.01); *H04L 41/0883* (2013.01); *H04L 41/5054* (2013.01); *H04L 43/08* (2013.01)

(56) References Cited

U.S. PATENT DOCUMENTS

| | | | | |
|---|---|---|---|---|
| 9,235,442 | B2* | 1/2016 | Kampas | G06F 9/50 |
| 2011/0138047 | A1 | 6/2011 | Brown et al. | |
| 2011/0145094 | A1 | 6/2011 | Dawson et al. | |
| 2011/0307354 | A1* | 12/2011 | Erman | G06F 8/60 |
| | | | | 705/27.1 |
| 2012/0066670 | A1 | 3/2012 | McCarthy et al. | |
| 2012/0198073 | A1* | 8/2012 | Srikanth | G06F 9/5027 |
| | | | | 709/226 |
| 2012/0290678 | A1 | 11/2012 | Dawson et al. | |
| 2013/0275272 | A1 | 10/2013 | Begin, Jr. et al. | |

OTHER PUBLICATIONS

Amrhein et al. "Harness the power of the cloud with IBM Workload-Deployer V3," Jun. 2011, pp. 1-19, Copyright IBM Corporation, IBM developer Works.

Servicenow Product Documentation, "Requesting an Amazon EC2 Instance for Cloud Provisioning," 2015, Retrieved from: http://wiki.servicenow.com, 3 pages.

Deng et al., Introducing Semantics to Cloud Services Catalogs, 2011, pp. 24-31, IEEE International Conference on Services Computing.

Hazard, "SoftLayer Private Clouds—Provisioning Speed," 2014, 12 pages, SOFTLAYER an IBM Company, Retrieved from: http://blog.softlayer.com/tag/provisioning.

* cited by examiner

DYNAMIC CLOUD SOLUTION CATALOG

TECHNICAL FIELD

The subject matter of this invention relates to cloud computing, and more specifically to a system and method for providing enhanced and dynamic cloud catalog information.

BACKGROUND

Cloud computing continues to grow as a preferred platform for information technology (IT) solutions. In particular, cloud computing allows enterprises to leverage shared resources in a pay "as you go" model, thus providing flexibility to adjust resources to meet the needs of a particular enterprise.

In a given cloud infrastructure, end-users can access or alter (i.e., provision) available resources such as memory, servers, applications, etc., via an interface provided by a cloud service provider or vendor. In a typical cloud environment, a cloud service provider provides a catalog of resources, typically an image list, available for end users. Users can then select a best match for their needs.

One of the challenges for users however is that catalog lists are generally very static in nature, and provide little or no guidance for the user. For example, the user may be provided with several options from the catalog to meet a particular set of requirements. Current catalogs are not capable of providing to the user relevant information, such as user feedback, metrics, support documentation, etc. Moreover, in situations where a user requires multiple images to implement a solution (e.g., a front-end Web application and a back-end server), the catalog typically only provides a fixed solution with no flexibility for the user's requirements. Any information provided is limited to the provisioned images.

Accordingly, current approaches to providing solutions via a cloud catalog lack robust information to assist in the selection and implementation of cloud resources.

SUMMARY

The present disclosure provides a system and method that implements a dynamic cloud solution catalog that provides robust information and resources for the end user to assist in the selection and implementation of cloud resources. Advantages of this approach include enriched catalog data and automated suggestions to improve user selections; the availability of configuration deployment information from other users; the availability of post provisioning information from other users; the availability of feedback and metrics from other users; the availability of ancillary documents and artifacts associated with a given resource; and an enhanced cloud portal environment.

A first aspect provides a cloud infrastructure, comprising: a cloud portal for providing user access to cloud resources; a cloud catalog database having a catalog list of cloud resources; a cloud catalog solution generator that populates the cloud catalog database, wherein the cloud catalog solution generator includes: a first interface process for receiving event data for resources associated within a cloud infrastructure, wherein the event data includes workload data, resource consumption data and catalog configuration data; a second interface process for receiving usage/account information, monitored information, and document information; an aggregation system that continuously aggregates the event data with the usage/account information, monitored information, and document information to create a dynamic catalog list having supplementary information for items in the catalog list; and a third interface process for outputting the dynamic catalog list to a cloud catalog database; and a cloud catalog suggestion engine that processes user inputs entered via the cloud portal and outputs a set of suggested items from the cloud catalog database.

A second aspect provides a cloud solution catalog generator that populates a cloud catalog database, comprising: an first interface process for receiving event data for resources associated within a cloud infrastructure, wherein the event data includes workload data, resource consumption data and catalog configuration data; a second interface process for receiving usage/account information, monitored information, and document information; an aggregation system that continuously aggregates the event data with the usage/account information, monitored information, and document information to create a dynamic catalog list having supplementary information for items in the catalog list; and a third interface process for outputting the dynamic catalog list to a cloud catalog database.

A third aspect provides a program product stored on a computer readable medium, which when executed by a processor cloud solution populates a cloud catalog database, comprising: program code for receiving event data that workload data, resource consumption data and catalog configuration data; program code for receiving usage/account information, monitored information, and document information; program code that continuously aggregates the event data with the usage/account information, monitored information, and document information to create a catalog list having supplementary information for items in the catalog list; and program code for outputting the catalog list to a cloud catalog database.

A fourth aspect provides a method for deploying a cloud infrastructure, comprising: providing a computer infrastructure being operable to: provide a cloud portal that allows user access to cloud resources; provide a cloud catalog database having a catalog list of cloud resources; provide a cloud catalog solution generator that populates the cloud catalog database, wherein the cloud catalog solution generator includes: a first interface process for receiving event data for resources associated within a cloud environment, wherein the event data includes workload data, resource consumption data and catalog configuration data; a second interface process for receiving usage/account information, monitored information, and document information; an aggregation system that continuously aggregates the event data with the usage/account information, monitored information, and document information to create a dynamic catalog list having supplementary information for items in the catalog list; and a third interface process for outputting the dynamic catalog list to a cloud catalog database; and provide a cloud catalog suggestion engine that processes user inputs entered via the cloud portal and outputs a set of suggested items from the cloud catalog database.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Figure 1:
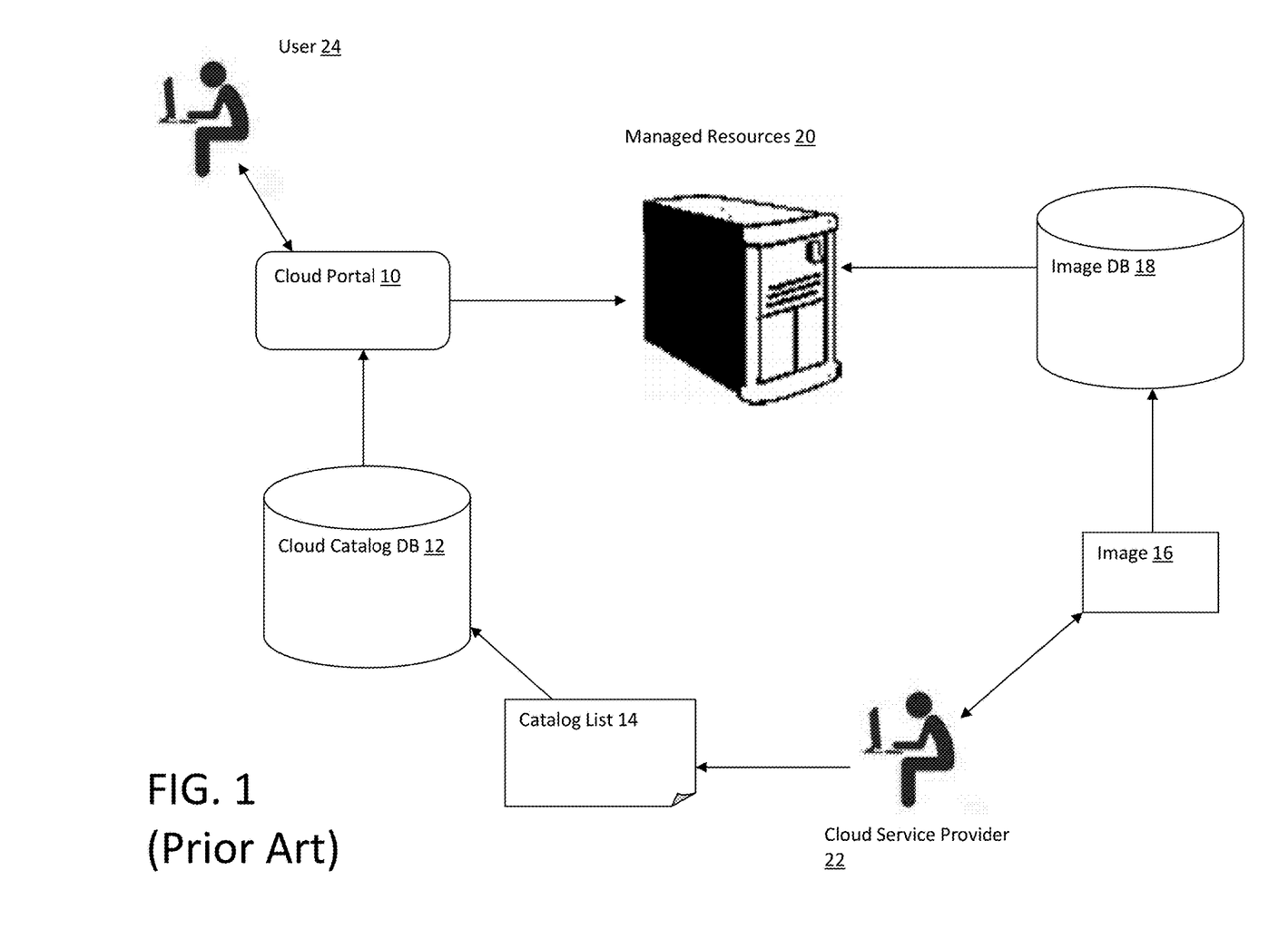
FIG. 1 shows a current approach used for cloud resource provisioning in a cloud infrastructure.

Referring now to the drawings, FIG. 1 depicts a typical approach to catalog implementation and cloud resource provisioning. As shown, a user 24 accesses a cloud portal 10 to select and provision managed resources 20 from the cloud. A cloud catalog database (DB) 12 provides a catalog list 14 of available images (or resources). Once an image is selected, a provisioning request is sent to the managed resources 20 and the requested image is deployed from the image database 18. The catalog list 14 is prepared by the cloud service provider 22, which consists of a static set of available images. Updating of the catalog list 14 occurs in a limited fashion, e.g., when a new image 16 is prepared by the cloud service provider and made available. In this approach, there is little or no ancillary information for images in the cloud catalog DB 12. Accordingly, the user 24 is left to his or her own experience or expertise when provisioning resources from the cloud portal 10. Often however, the user 24 may lack a complete understanding or knowledge of how to select a specific catalog item in cloud catalog DB 12 and deploy suitable images in image DB 18 within the user's environment.

Figure 2:
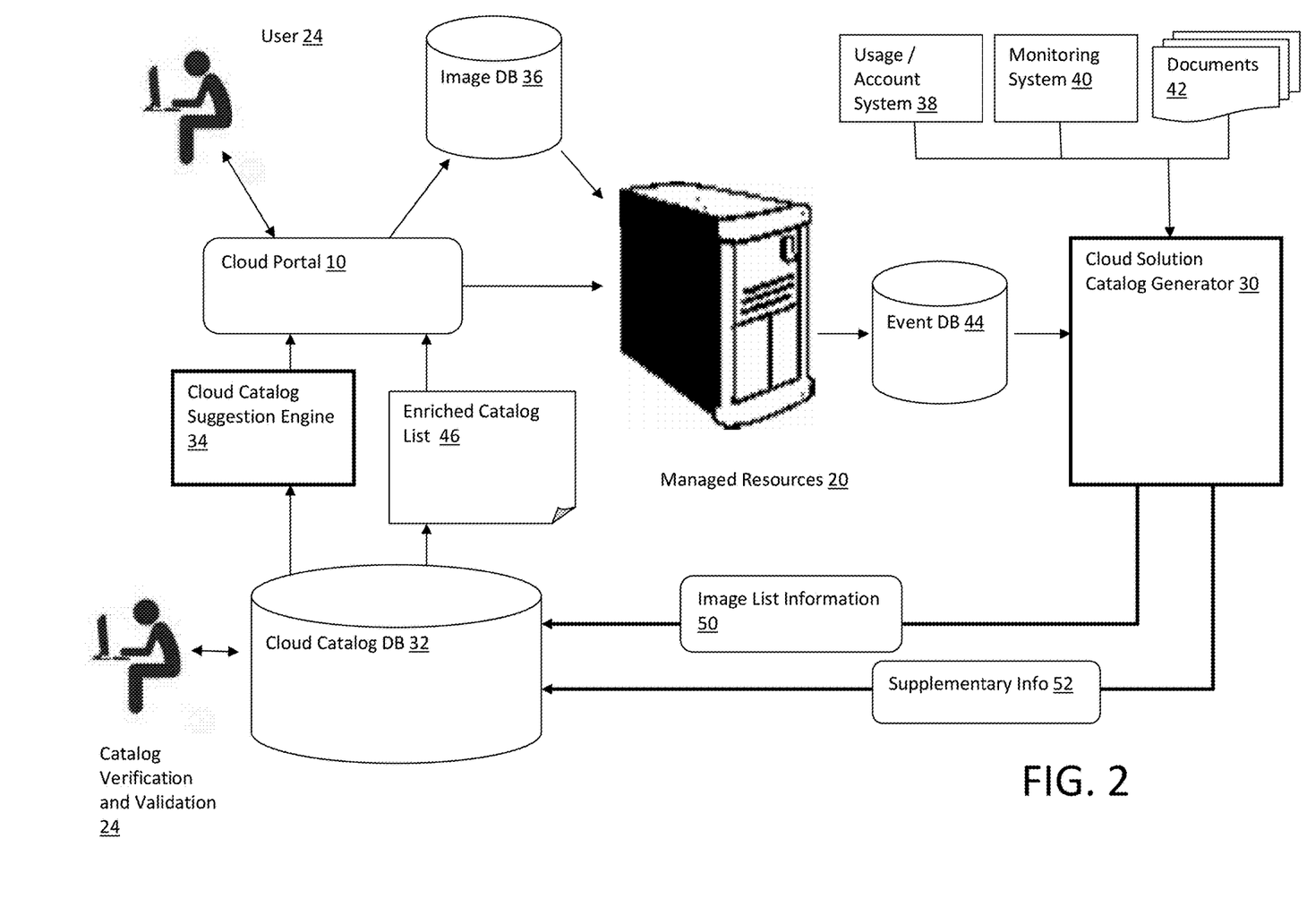
FIG. 2 shows an overview of a cloud infrastructure that utilizes a cloud solution generator and cloud catalog suggestion engine according to embodiments.

The present approach involves a cloud solution catalog that dynamically provides more enriched and robust information for the user 24 when selecting a specific catalog item and implementing cloud resources with the specific catalog item. An illustrative embodiment is shown in FIG. 2, which utilizes a cloud solution catalog generator 30 to automatically generate and update both the image list information 50 and supplementary information 52 for the cloud catalog database (DB) 32. Supplementary information 52 includes information associated with resources in the catalog list that can assist the user 24 in selecting and implementing cloud resources. Supplementary information 52 may for example include meta-data describing business uses for available images, installed software and configurations for deployed images, usage monitoring and account metrics of deployed images, other management data for listed images, solution design documents, user feedback such as scores, reputation of the user, provisioning ease, etc.

An illustrative process operates as follows. Whenever the image from image DB 36 to a managed resource 20 is provisioned with the request by a user 24, an event database 44 stores associated deployment instance information for the image, including the image name, configuration, and other installed software. The information from the event database 44 is fed into the cloud solution catalog generator 30, along with information from a usage/account system 38 and monitoring system 40. In addition, any available documents 42 associated with images in the image DB 36 and cloud catalog DB 32 are identified and fed into the cloud solution catalog generator 30. All of the collected data is processed and aggregated to create supplementary information 52 that is linked with the provisioned images 50 and stored in the cloud catalog DB 32 as an associated catalog item with the original catalog item in cloud catalog DB 32. A catalog verification and validation system 24 may be implemented, e.g., either manually or automatically, to ensure the supplementary information 52 is accurate with a review. An enriched catalog list 46, which includes the supplementary information, is thus made available to the user 24 via the cloud portal 10 directly.

Supplementary information 52 thus may be created from: (1) the event database 44; (2) information collected from other end users and their accounts via the usage/account system 38, (3) information collected by monitoring deployed resources via monitoring system 40, and (4) existing solution design documents 42, provided by the service providers or end users. These information streams are continuously aggregated by the cloud solution catalog generator with information from the event database 44, which provides workload details, resource consumption details, and catalog configuration details. Once aggregated, a dynamic set of set of catalog information is generated and regularly updated for the user 24.

Usage/account information may include usage metrics for accounting purposes (e.g., CPU, Memory, Disk and Network usages, application program usages, active/inactive time for instance, number of users/processes), system information and configurations as deployed by other users outside of the cloud, manual configurations required by an end user at post provisioning, user feedback and rankings, experience level of end users, etc. Also, information regarding deployed infrastructures may be captured and provided, including design configurations, on-premises configurations, other installed components, edge components, and geographical and physical location information.

Monitoring information may include real-time activity data, e.g., number of downloads, total hours of operation for a given resource, captured performance metrics (CPU/Memory/Disk/Network, response time for transactions, service available time), etc. Activity data may also include, e.g., number of client accesses, bandwidth estimations, response time information, etc.

Solution design documents 42 may include any document, chart or artifact, e.g., made available by the cloud service provider, vendors or other users, which might assist the users to prepare their own solution on the cloud. Documents may include solution descriptions, e.g., requirement/background, architecture, technical diagrams, design, relating to installations and configurations for both pre and post provisioning activities during the solution lifecycle on cloud.

In one embodiment, end users may be rewarded (e.g., with discounts, points, benefits for cloud service, upgraded user level, etc.) when they share information such as configuration, usage/account, monitoring and documents with other users. In such a case, end users and their provided information may be kept anonymous to other end users with a sanitization process.

To further enhance the user experience, a cloud catalog suggestion engine 34 may also be provided that will suggest, e.g., catalog items, best selections among the catalog items based on input from cloud catalog DB 32 and user inputs, e.g., inputted user requirements, environment, preferences, and historical usages. The cloud catalog suggestion engine 34 operates using a set of rules with a rules engine. Illustrative approaches may include an engine that employs an average method or a peak method. In the average method, the average of the results from various input sources is computed for each occurrence of the event in order for the engine to predict a possible future state. Therefore, this method is highly iterative in nature and has the most optimal resource provisioning. The peak method ensures that peak occurrences are strictly tailored to and that those events are captured for the engine to compute a possible future state encompassing the set of buffer resources. This helps cater to workload prediction models that need a large room for variation. The outcome of resource provisioning has some wastage of additional unused resources.

The cloud solution catalog generator 30 and cloud catalog suggestion engine 34 interoperate to provide a technical effect of providing an enriched catalog list experience for a user 24 seeking to provision cloud resources. These may for example be implemented within a computing system 60, such as that shown in FIG. 3. The processes may each be implemented as a system, a method, and/or a computer program product. The computer program product may include a computer readable storage medium (or media) having computer readable program instructions thereon for causing a processor to carry out aspects of the present invention.

Figure 4:
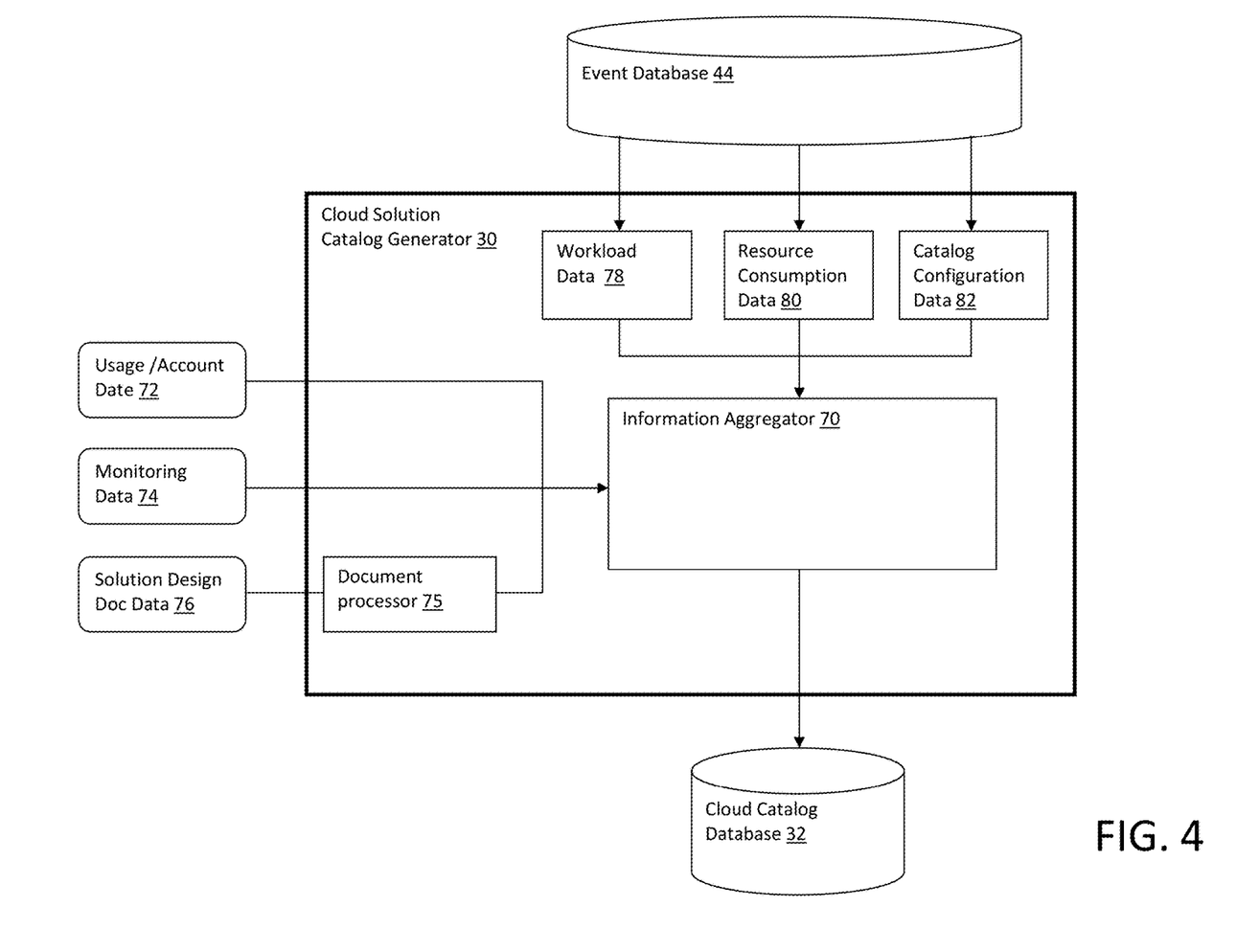
FIG. 4 shows a detailed schematic of a cloud solution catalog generator according to embodiments.

FIG. 4 depicts a more detailed schematic of the cloud solution generator 30, which has the technical effect of enhancing cloud catalog DB 32. Central to the cloud solution generator 30 is an information aggregator 70 that provides an interface process to input usage/account data 72, monitoring data 74 and solution design document data 76 via document processor 75, which are described elsewhere herein. Also collected into the information aggregator from the event database 44 via a further interface process is workload data 78, resource consumption data 80 and catalog configuration data 82. The resulting output is an enriched cloud catalog DB 32 that includes not only a list of catalog images but also supplementary information that will assist in the selection and implementation of cloud resources by a user.

As shown, document processor 75 may be utilized to ingest and process solution design document data 76. Solution design document data 76 may for example include physical/logical diagrams for network/system/disk, architecture, requirements, design, system context, other related documents to solution design, etc. In one approach, metadata for business aspect and summary text are captured from available documents and added to catalog items. Metadata may include filenames, file formats, timestamps, a location of the document, users' background/business, link to related information, etc. A hypertext link may be added to catalog items to allow for easy retrieval for the user. Advantages include the ability for the user to view such documents when perusing catalog items via the cloud portal.

In a further embodiment, information aggregator 70 may compare and link deployed instances with actual items from the image DB 36. For instance, a solution in the image DB 36 may include three virtual machines VM1, VM2 and VM3. An actual deployed instance of the solution may comprise VM1', VM2' and VM3'. Differences between the two solutions may be determined to capture file and configuration changes. This information may be included in the cloud catalog DB 32 with the solution, and has the advantage of allowing the user to understand potential configuration changes that may need to be made before selecting a solution. Furthermore, the actual deployed instance itself may be registered in the cloud catalog DB 32 as a separate or related item, which has the further advantage of allowing the user to select a preconfigured solution.

Figure 5:
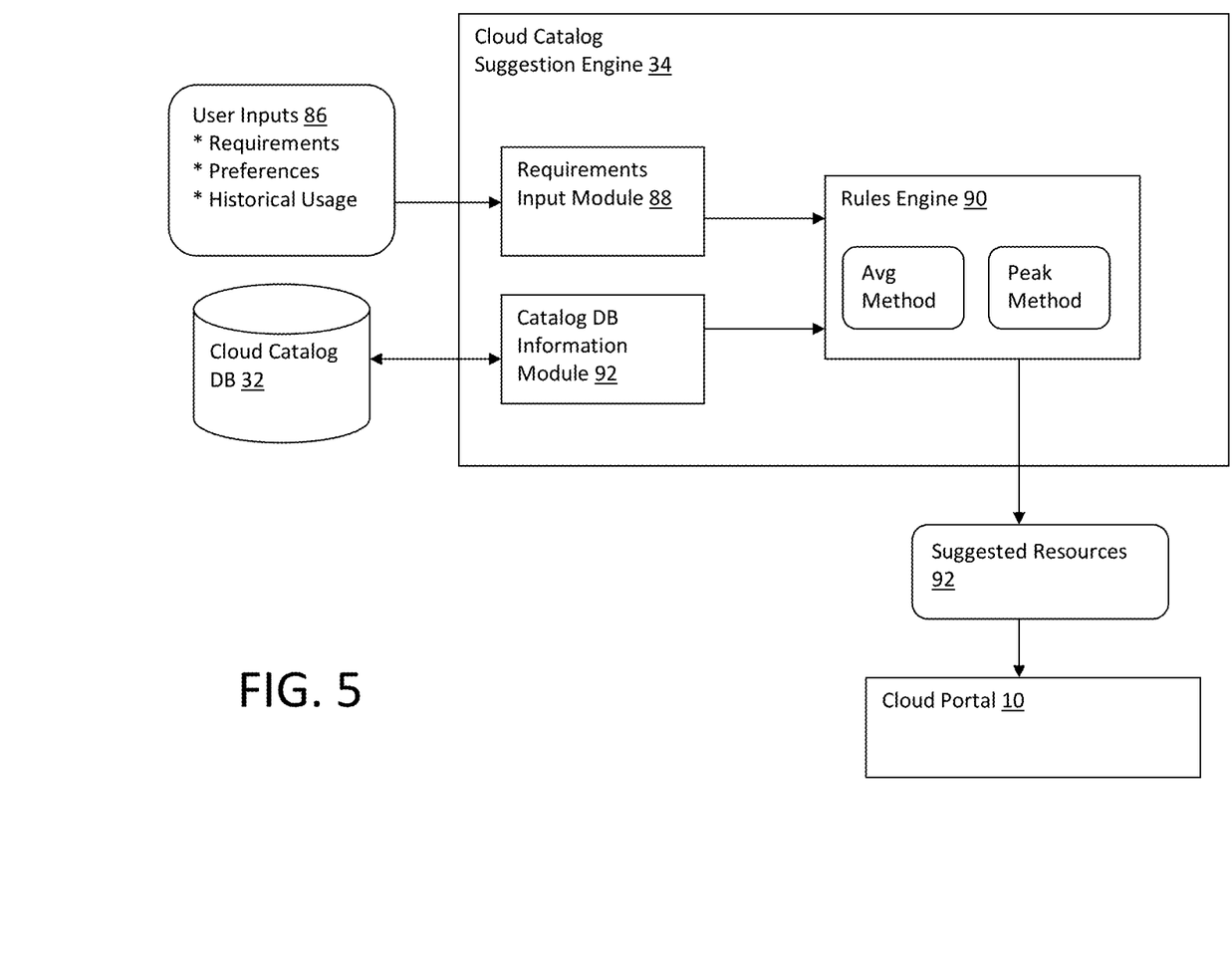
FIG. 5 shows a detailed schematic of a cloud catalog suggestion engine according to embodiments.

FIG. 5 depicts a more detailed schematic of the cloud catalog suggestion engine 34. As shown, engine 34 includes: a requirements input module 88 for receiving user inputs 86, such as technical requirements, preferences and historical usage; a catalog database information module 92 for interfacing with the cloud catalog DB 32; and a rules engine 90. Based on the user inputs 86 and available images in the cloud catalog DB 32, the rules engine 90 will generate a set of suggested resources 92 for the user via the cloud portal 10. As shown, rules engine 90 may use an average method or peak method (described above) for generating the suggested resources 92. It is understood however, that any methodology may be employed for generating suggested resources 92.

Information in suggestion resources 92 may be based on actual deployment statistics of catalog items, user scores and ratings, user comments, reputation of catalog creators, historical data of the catalog item, etc.

Figure 6:
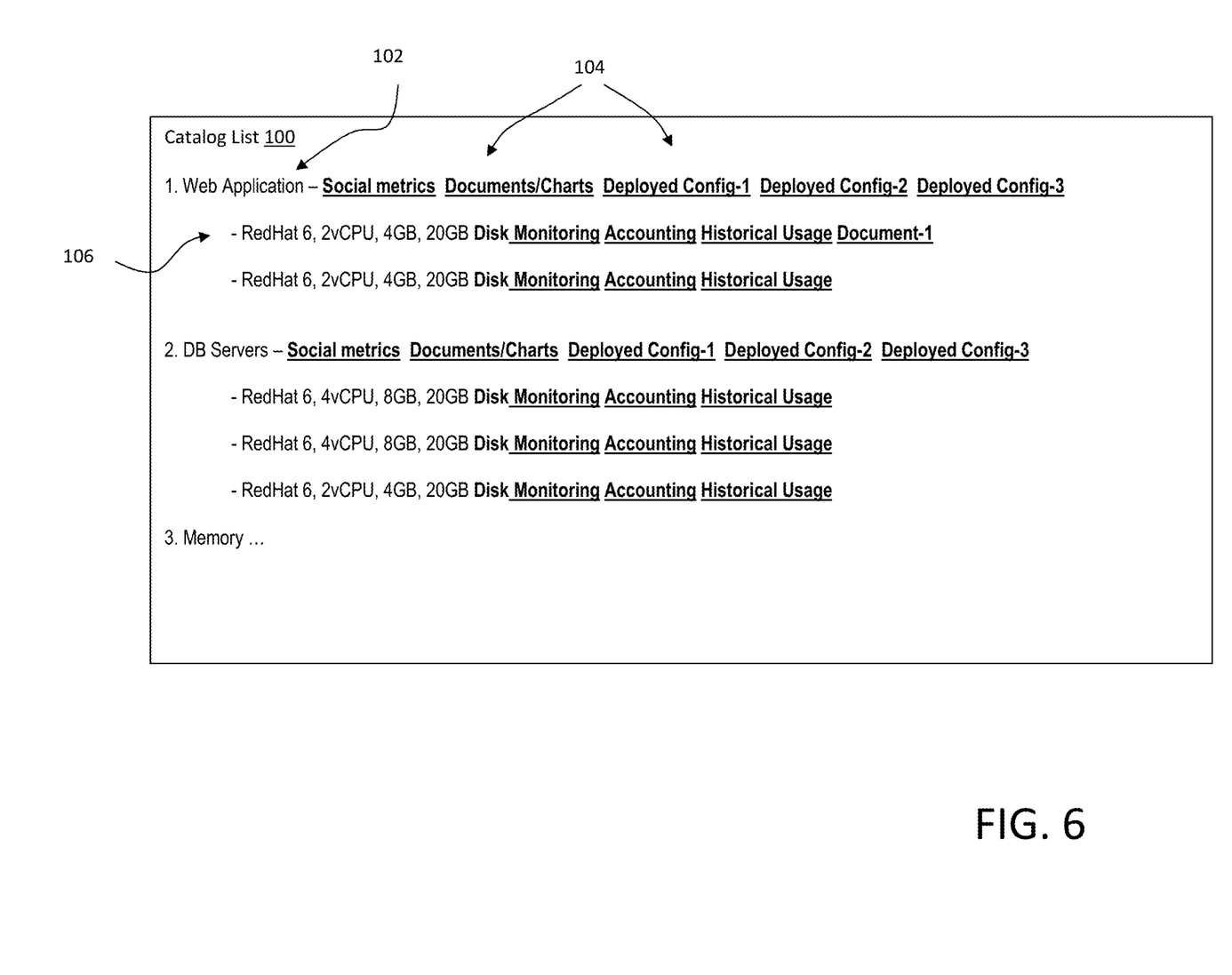
FIG. 6 shows an example of cloud catalog interface according to embodiments.

FIG. 6 depicts an example of a portion of an enriched catalog list 100 shown to user 24 via a cloud portal 10. As shown, a list of available catalog items 102 is depicted, along with supplemental information 104. Supplemental information 104 is depicted as a set of hyperlinks, which can be clicked by the user to obtain or view additional resources and information. In this case, when the user clicks on Deployed Config-1, additional supplemental information 106 is provided regarding an existing user's deployed configuration on cloud. Additional supplemental information 106 likewise may include hyperlinks that allow the user to drill down for more information about the item 102.

Clicking on the "Monitoring" link on additional supplemental information 106 would for example provide graphs and information relating to activity and performance of the catalog item by others using a deployed instance in real time. The "Accounting" link would for example bring up costs and charges associated with deployed instances of the item. The "Historical Usage" link would for example bring up a screen showing monitoring and usage data over time of deployed instances of a catalog item. An advantage is that users can see live data associated with deployed images and select the right item from the list.

As noted above, the cloud solution catalog generator 30 and cloud catalog suggestion engine 34 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
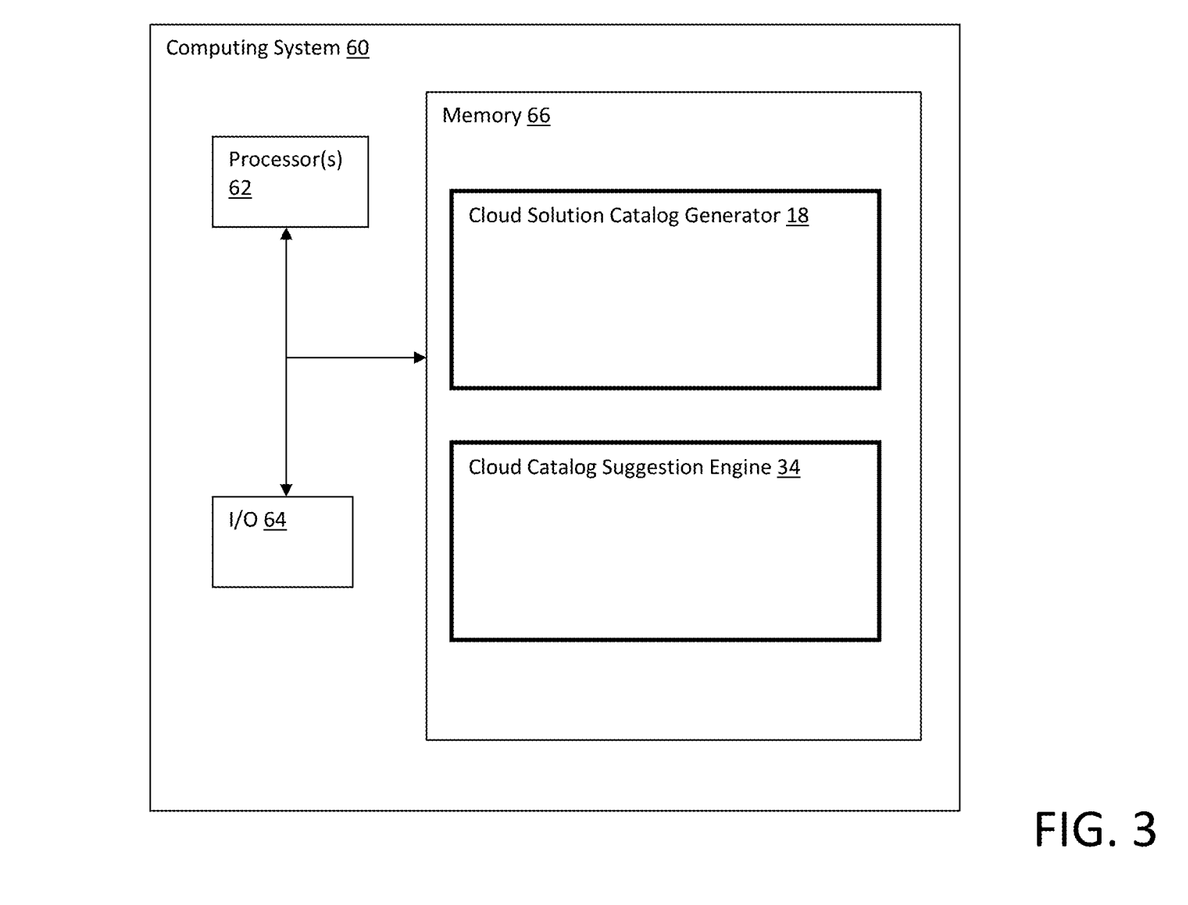
FIG. 3 shows a computer system having a cloud solution catalog generator and cloud catalog suggestion engine according to embodiments.

FIG. 3 depicts an illustrative computing system 60 that may comprise any type of computing device and, and for example includes at least one processor 62, memory 66, an input/output (I/O) 64 (e.g., one or more I/O interfaces and/or devices), and a communications pathway. In general, processor(s) 62 execute program code which is at least partially fixed in memory 66. While executing program code, processor(s) 62 can process data, which can result in reading and/or writing transformed data from/to memory and/or I/O 64 for further processing. The pathway provides a communications link between each of the components in computing system 60. I/O 64 can comprise one or more human I/O devices, which enable a user to interact with computing system 60.

Furthermore, it is understood that the cloud solution catalog generator 30 and/or cloud catalog suggestion engine 34 or relevant components thereof (such as an API component) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will, select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A cloud infrastructure, comprising: a computing system including a display screen, the computing system including: a cloud portal for providing user access to cloud resources; a cloud catalog database having a catalog list of cloud resources; a cloud catalog solution generator that populates the cloud catalog database, wherein the cloud catalog solution generator includes:
   a first interface process for receiving event data for resources associated within a cloud infrastructure;
   a second interface process for receiving usage/account information, monitored information, and document information;
   an aggregation system that continuously aggregates the event data with the usage/account information, monitored information, and document information to create a dynamic catalog list having supplementary information for items in the catalog list, wherein the document information includes links to documents associated with cloud resources; and
   a third interface process for outputting the dynamic catalog list to a cloud catalog database;
   a cloud catalog suggestion engine that processes user inputs entered via the cloud portal and provides a set of suggested items from the cloud catalog database;
   the computing device being configured to display on the display screen via the cloud portal the set of suggested items from the cloud catalog database and a menu of selectable hyperlinks for each suggested item, the selectable hyperlinks for each suggested item being selectable by a user to access and display on the display screen at least a portion of the supplementary information associated with the suggested item, the hyperlinks including links to previous deployments including the suggested items; and
   a provisioning system for receiving, via the cloud portal, a user selection of a set of the suggested items from the cloud catalog.

2. The cloud infrastructure of claim 1, wherein the usage/account information includes feedback from other users who have provisioned cloud resources.

3. The cloud infrastructure of claim 1, wherein the monitored information includes performance metrics for provisioned cloud resources.

4. The cloud infrastructure of claim 1, wherein the cloud catalog suggestion engine includes a rules engine for determining suggested items based on user inputs that include user requirements, a usage history, and user preferences.

5. A method for deploying a cloud infrastructure, comprising:
   allowing, by a computer infrastructure including a computing system coupled to a display screen, user access to cloud resources via a cloud portal;
   populating, by a cloud catalog solution generator, a cloud catalog database, the populating comprising:
      receiving, by a first interface process of the cloud catalog solution generator, event data for resources associated within a cloud environment;
      receiving, by a second interface process of the cloud catalog solution generator, usage and/or account information, monitored information, and document information;
      continuously arrogating, by an aggregation system of the cloud catalog solution generator, the event data with the usage and/or account information, the monitored information, and the document information to create a dynamic catalog list having supplementary information for items in the catalog list, wherein the document information includes links to documents associated with cloud resources;
      outputting, by a third interface process of the cloud catalog solution generator, the dynamic catalog list to the cloud catalog database; and
   processing, by a cloud catalog suggestion engine, user inputs entered via the cloud portal, wherein the cloud catalog suggestion engine further provides a set of suggested items from the cloud catalog database;
   displaying on the display screen via the cloud portal the set of suggested items from the cloud catalog database and a menu of selectable hyperlinks for each suggested item, the selectable hyperlinks for each suggested item being selectable by a user to access and display on the display screen at least a portion of the supplementary information associated with the suggested item, the hyperlinks including links to previous deployments including the suggested items; and
   receiving, by a provisioning system via the cloud portal, a user selection of a set of the suggested items from the cloud catalog.

6. The method of claim 5, wherein the usage/account information includes feedback from other users who have provisioned cloud resources.

7. The method of claim 5, wherein the monitored information includes performance metrics for provisioned cloud resources.

* * * * *